United States Patent
Kitoh et al.

(10) Patent No.: US 7,400,800 B2
(45) Date of Patent: Jul. 15, 2008

(54) ARRAYED WAVEGUIDE GRATING TYPE OPTICAL MULTIPLEXER/DEMULTIPLEXER CIRCUIT

(75) Inventors: Tsutomu Kitoh, Kanagawa-ken (JP);
Yasuyuki Inoue, Kanagawa-ken (JP);
Mikitaka Ito, Kanagawa-ken (JP);
Yoshinori Hibino, Kanagawa-ken (JP);
Akimasa Kaneko, Shibuya-Ku (JP)

(73) Assignees: NTT Electronics Corporation, Tokyo (JP); Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 10/540,789

(22) PCT Filed: Dec. 26, 2003

(86) PCT No.: PCT/JP03/17065

§ 371 (c)(1),
(2), (4) Date: Apr. 14, 2006

(87) PCT Pub. No.: WO2004/061496

PCT Pub. Date: Jul. 22, 2004

(65) Prior Publication Data

US 2006/0233491 A1 Oct. 19, 2006

(30) Foreign Application Priority Data

Dec. 27, 2002 (JP) ............................. 2002-378882

(51) Int. Cl.
*G02B 6/26* (2006.01)
(52) U.S. Cl. .............................. 385/43; 385/37; 385/24; 385/46; 385/28
(58) Field of Classification Search .................. 385/37, 385/43
See application file for complete search history.

(56) References Cited

U.S. PATENT DOCUMENTS 5,136,671 A 8/1992 Dragone (Continued)

FOREIGN PATENT DOCUMENTS

CN 1273471 11/2000

(Continued)

OTHER PUBLICATIONS

K. Okamoto and A. Sugita, *Flat Spectral Response Arrayed-Waveguide Grafting Multiplexer with Parabolic Waveguide Horns*, Electronics Letters, vol. 32, No. 18, Aug. 29, 1996.

(Continued)

*Primary Examiner*—Frank G. Font
*Assistant Examiner*—Eric Wong
(74) *Attorney, Agent, or Firm*—Workman Nydegger

(57) ABSTRACT

An arrayed waveguide grating type optical multiplexer/demultiplexer circuit in which wavelength dispersion is reduced. An input wave guide (1), a first slab waveguide (2), an arrayed waveguide (3), a second slab waveguide (4) and an output waveguide (5) are connected sequentially. Furthermore, a parabola waveguide (6) is provided between the input waveguide (1) and the first slab waveguide (2), and a taper waveguide (7) is provided between the second slab waveguide (4) and the output waveguide (5). A parabola waveguide length $Z_0$ exists in a range $Z_{a,0} \leq Z_0 \leq Z_{p,0}$ determined by a parabola waveguide length $Z_{a,0}$ where the ratio of absolute amplitude between the main peak and the first side peak in the field distribution of far-field of the parabola waveguide (6) has an upper limit of 0.217, and a parabola waveguide length $Z_{p,0}$ where the relative phase of the main peak and the first side peak in the field distribution of far-field has a lower limit of 3.14 radian.

2 Claims, 11 Drawing Sheets

U.S. PATENT DOCUMENTS

| | | | |
|---|---|---|---|
| 5,467,418 | A | 11/1995 | Dragone |
| 6,069,990 | A | 5/2000 | Okawa et al. |
| 6,188,818 | B1 | 2/2001 | Han et al. |
| 6,222,956 | B1 | 4/2001 | Akiba et al. |
| 6,298,186 | B1 | 10/2001 | He |
| 6,563,988 | B2 * | 5/2003 | McGreer ............. 385/43 |
| 6,633,703 | B2 * | 10/2003 | Katayama ............. 385/37 |
| 6,898,345 | B2 * | 5/2005 | Okamoto et al. ............. 385/24 |
| 2002/0001433 | A1 | 1/2002 | Hosoi |
| 2002/0150338 | A1 | 10/2002 | Hosoi |
| 2002/0159703 | A1 * | 10/2002 | McGreer ............. 385/43 |
| 2002/0176665 | A1 | 11/2002 | Missey et al. |

FOREIGN PATENT DOCUMENTS

| | | |
|---|---|---|
| EP | 0 783 118 A1 | 7/1997 |
| EP | 1 333 300 A2 | 8/2003 |
| FR | 2 779 298 | 12/1999 |
| JP | 7-333447 | 12/1995 |
| JP | 7222447 | 12/1995 |
| JP | 9-297228 | 11/1997 |
| JP | 11-142661 | 5/1999 |
| JP | 2002-90561 | 3/2002 |
| JP | 2002-311264 | 10/2002 |

OTHER PUBLICATIONS

Mikitaka Ito et al., *Design Parameter Dependence of Chromatic Dispersion in Silica-Based AWG*, The Institute of Electronics, Information and Communication Engineers electronics Society Taikai, Aug. 20, 2002, Koen Ronbunshu 1, pp. 161.

Hiroaki Yamada et al., *Dispersion Resulting from Phase and Amplitude Errors in Arrayed-Waveguide Grating Multiplexers-Demultiplexers*, Optics Letters, vol. 25, No. 8, Apr. 15, 2000, pp. 569-571.

Michael E. Marhic, *Calculation of Dispersion in Arrayed Waveguide Grating Demultiplexers by a Shifting-Image Method*, IEEE Journal of Selected Topics in Quantum Electronics, vol. 8, No. 6, Nov./Dec. 2002, pp. 1149-1157.

T. Kitoh et al., *Low Chromatic-dispersion Flat-top Arrayed Waveguide Grating Filter*, Electronics Letters, vol. 39, No. 15, Jul. 24, 2003, pp. 1116-1118.

K. Okamoto, *Fundamentals of Optical Waveguides*, Academic Press, 2000, pp. 346-381.

\* cited by examiner $$z = A(w^2 - w_0^2) - z_0$$

ARRAYED WAVEGUIDE GRATING TYPE OPTICAL MULTIPLEXER/DEMULTIPLEXER CIRCUIT

TECHNICAL FIELD

The present invention relates to an arrayed waveguide grating type optical multiplexer/demultiplexer for use in optical wavelength division multiplexing communication systems.

BACKGROUND ART

At present, development of an optical wavelength division multiplexing communication system using a plurality of optical wavelengths being actively pursued in order to increase communication capacity. In this optical wavelength division multiplexing communication system, an arrayed waveguide grating type optical multiplexer/demultiplexer circuit is widely used in optical wavelength multiplexing and demultiplexing circuits for multiplexing a plurality of optical signals at the transmitter side or for demultiplexing a plurality of optical signals traveling through one optical fiber into different ports at the receiver side.

FIG. 8 is a block diagram of a conventional arrayed waveguide grating type optical multiplexer/demultiplexer circuit.

As shown in FIG. 8, a conventional arrayed waveguide grating type optical multiplexer/demultiplexer circuit has an input waveguide 1, a first slab waveguide 2 connected to the input waveguide 1, an arrayed waveguide 3 connected to the first slab waveguide 2 and constituted of a plurality of optical waveguides sequentially becoming longer with a predetermined waveguide length differences, a second slab waveguide 4 connected to the arrayed waveguide 3, and a plurality of output waveguides 5 connected to the second slab waveguide 4 (for an example, refer to K. Okamoto, "Fundamentals of Optical Waveguides", Academic Press, pp. 346-381, 2000). These are constituted by using an optical waveguide which is made up of a core with high refractive index formed on a flat substrate 10 and a clad around the core.

In the case of the conventional arrayed waveguide grating type optical multiplexer/demultiplexer circuit shown in FIG. 8, the light led into the input waveguide 1 is spread in the first slab waveguide 2 and branched to respective optical waveguides in the arrayed waveguide 3. Moreover, the light is multiplexed by the second slab waveguide 4 again and led into the output waveguides 5. In this case, an optical field pattern projected to an end of the first slab waveguide 2 at the arrayed waveguide 3 side is basically replicated to an end of the second slab waveguide 4 at the arrayed waveguide 3 side.

Furthermore, because the arrayed waveguide 3 is provided so that adjacent optical waveguides differ from each other in optical path length by $\Delta L$, an optical field has an inclination which depends on the wavelength of the input light. The optical field changes its focusing position depending on each wavelength by the inclination at the output waveguide 5 side of the second slab waveguide 4 and as a result, it is possible to demultiplex the wavelength. Upon receiving light from the output waveguide 5 side, due to reciprocity of light, light of different wavelength is multiplexed and emitted from the input waveguide 1.

This arrayed waveguide grating type optical multiplexer/demultiplexer circuit is becoming an indispensable optical component in optical multiplex communication systems in that it can make a single optical fiber transmit a plurality of signals of different wavelength.

Moreover, various pass-band-expansion arrayed waveguide grating type optical multiplexer/demultiplexer circuits have been proposed which respectively expand the transmission wavelength band width of the arrayed waveguide grating type optical multiplexer/demultiplexer circuit shown in FIG. 8 (for an example, refer to K. Okamoto and A. Sugita, "Flat spectral response arrayed-Waveguide grating multiplexer with Parabola waveguide horns", Electronics Letters, Vol. 32, No. 18, pp. 1661-1662, 1996).

FIGS. 9A and 9B are block diagrams of a conventional pass-band-expansion arrayed waveguide grating type optical multiplexer/demultiplexer circuit.

As shown in FIG. 9A, the conventional pass-band-expansion arrayed waveguide grating type optical multiplexer/demultiplexer circuit has a configuration in which a parabola waveguide 6 in a parabolic shape is provided between the input waveguide 1 and the first slab waveguide 2 of the conventional arrayed waveguide grating type optical multiplexer/demultiplexer circuit shown in FIG. 8. As shown in FIG. 9B, when expressing a coefficient as A, the width of the input waveguide 1 as $W_0$, and the length of the parabola waveguide 6 from the first slab waveguide 2 as $Z_0$, the width W of the input optical waveguide 1 contacting with the first 20 slab waveguide 2 is defined with respect to the propagation axis Z of the optical wave by the following equation.

$$Z = A(W^2 - W_0^2) - Z_0$$

When using this parabola waveguide 6, an optical field formed by the parabola waveguide 6 becomes distributions shown in FIGS. 10A and 10B. FIG. 10A a three-dimensional distribution illustration of an optical field in the parabola waveguide 6 shown in FIG. 9B and FIG. 10B is a two-dimensional distribution illustration of an optical field in the width direction (x direction) of the parabola waveguide 6 at an end portion of the parabola waveguide 6, that is, the boundary between the parabola waveguide 6 and the first slab waveguide 2.

As shown in FIG. 10A, the optical field in the input waveguide 1 has one peak. However, in the parabola waveguide 6 (at the right portion of the position of $Z=-Z_0$ in FIG. 10A), a distribution of optical fields having two peaks is formed. Moreover, the distribution of optical fields at the boundary portion at which the parabola waveguide 6 contacts with the slab waveguide 2 has a double peak as shown in FIG. 10B. Accordingly, at the end of the second slab waveguide 4 at the output waveguide 5 side, the optical field having the double peak is also reproduced and combined with the output waveguide 5. Therefore, it is possible to expand a transmission wavelength band.

However, the conventional pass-band-expansion arrayed waveguide grating type optical multiplexer/demultiplexer circuit provided with the above parabola waveguide has a serious drawback. That is, it has a high wavelength dispersion value due to a phase distribution in the parabola waveguide. FIG. 11 shows graphs of wavelength dispersion and loss with respect to an optical wavelength in the conventional pass-band-expansion arrayed waveguide grating type optical multiplexer/demultiplexer circuit. As obvious in FIG. 11, it is found that the wavelength dispersion value with respect to the optical wavelength is high at the central wavelength, which is taken as a maximum wavelength dispersion value, and greatly changes in wavelength regions around the central wavelength. This wavelength dispersion characteristic causes a problem that an optical signal (pulse) is extremely deteriorated because the dispersion provides different delay times for optical signal spectrum components in one channel.

The present invention is made to solve the above problem and its object is to provide an arrayed waveguide grating type optical multiplexer/demultiplexer circuit with reduced wavelength dispersion.

DISCLOSURE OF THE INVENTION

An arrayed waveguide grating type optical multiplexer/demultiplexer circuit for solving the above problem is constituted by using optical waveguides provided with a core with high refractive index on a flat substrate and a clad around the core; and comprises a plurality of first optical waveguides, a first slab waveguide connected to the first optical waveguides, an arrayed waveguide constituted of a plurality of optical waveguides which are connected to the first slab waveguide and each of which length sequentially becomes longer with a prescribed waveguide length difference, a second slab waveguide connected to the arrayed waveguide, and a plurality of second optical waveguides connected to the second slab waveguide; further comprises a parabola waveguide in which a width W of the first optical waveguide contacting with the first slab waveguide is defined by the following equation with respect to the propagation axis Z of optical wave:

$$Z = A(W^2 - W_0^2) - Z_0$$

where A: a coefficient, $W_0$: a width of the first optical waveguide, and $Z_0$: a length of the first slab waveguide, and a taper waveguide in which a width W' of the second optical waveguide contacting with the second slab waveguide is defined by the following equation with respect to the propagation axis Z of optical wave:

$$Z = A'(W' - W_0') - Z_0'$$

where A': a coefficient, $W_0'$: a width of the second optical waveguide, and $Z_0'$: a length of the second slab waveguide, and is characterized in that a parabola waveguide length $Z_0$ is set in a range $Z_{a,0} \leq Z_0 \leq Z_{p,0}$ determined by a parabola waveguide length $Z_{a,0}$ where the ratio of amplitude absolute values between the main peak and the first side peak in the field distribution of far-field of the parabola waveguide has an upper limit of 0.217, and a parabola wavelength $Z_{p,0}$ where the relative phase of the main peak and the first side peak in the field distribution of far-field has a lower limit of 3.14 radian.

Moreover, an arrayed waveguide grating type optical multiplexer/demultiplexer circuit of the present invention for solving the above problem is characterized in that the optical waveguide comprises a quartz-glass optical waveguide on a flat silicon substrate.

BEST MODE FOR CARRYING OUT THE INVENTION

For an arrayed waveguide grating type optical multiplexer/demultiplexer circuit to have a pass band of a flat transmission characteristic and low wavelength dispersion, it is preferable that the circuit has a parabola waveguide and the field distribution of far-fields of the parabola waveguide is equiphase and rectangular. In this case, it is known that the amplitude of the field distribution of far-fields of the parabola waveguide becomes a sinc function.

Figure 1:
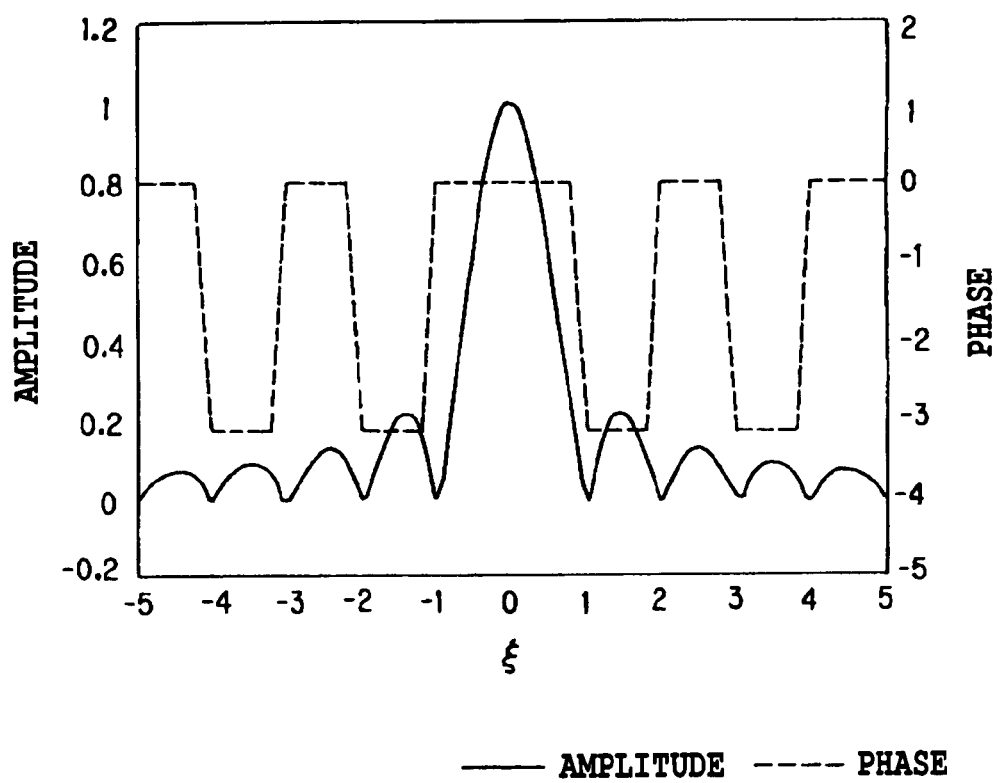
FIG. 1 is a graph showing amplitude and phase of a general sinc function.

The equation of a general sinc function is shown below. FIG. 1 is an illustration showing a graph of amplitude and phase to be a sinc function.

$$G(\xi) = \text{sink}(p\xi) = \sin(p\xi)/p\xi$$

In this case, the variable ξ is an angle (rad.) value normalized by p.

As shown in FIG. 1, the amplitude serving as a sinc function becomes a distribution having a main peak at the center and symmetrically having a plurality of small peaks at both sides thereof. Moreover, the sinc function is a real function and its imaginary part is zero. Therefore, phase planes become equal. That is, a phase characteristics shows a rectangular shape having a flat phase (equiphase) portion close to the variable ξ=0.

Figure 2:
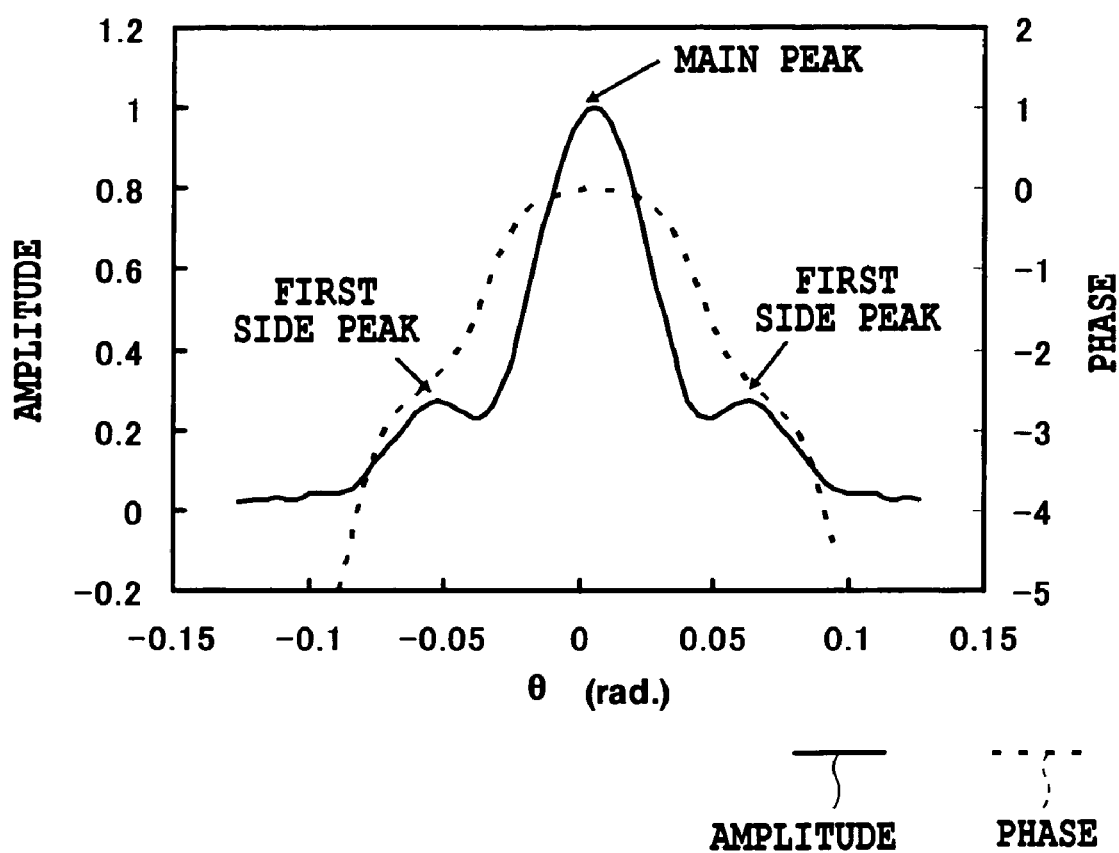
FIG. 2 is a graph showing amplitude and phase in the far-field of a parabola waveguide.

However, the field distribution of far-fields of an actual parabola waveguide becomes that of the graph shown in FIG. 2. As shown in FIG. 2, amplitudes of the field distribution of far-fields of the parabola waveguide are similar to the sinc function and show a distribution in which two side peaks (first side peaks) are present at the both sides of a main peak.

Moreover, phases show a distribution having an almost flat phase portion close to the angle θ=0. In the graph in FIG. 2, the amplitude indicates an absolute value and the angle θ is obtained by putting the traveling direction (optical axis) of a light wave incident on the parabola waveguide to 0.

As understood from the comparison between FIGS. 1 and 2, to realize an ideal field distribution, that is, an equiphase rectangular field distribution, it is allowed to consider the amplitude and phase of a first side peak as approximate scales with a sinc function on the basis of the amplitude and phase of the main peak in the field distribution of far-fields of an actual parabola waveguide. That is, the present invention realizes an equiphase rectangular field distribution and the transmission characteristic and low-wavelength dispersion of a flat pass band by specifying the field distribution of far-fields of a parabola waveguide as an approximate scale with a sinc function in an arrayed waveguide grating type optical multiplexer/demultiplexer circuit.

Figure 3:
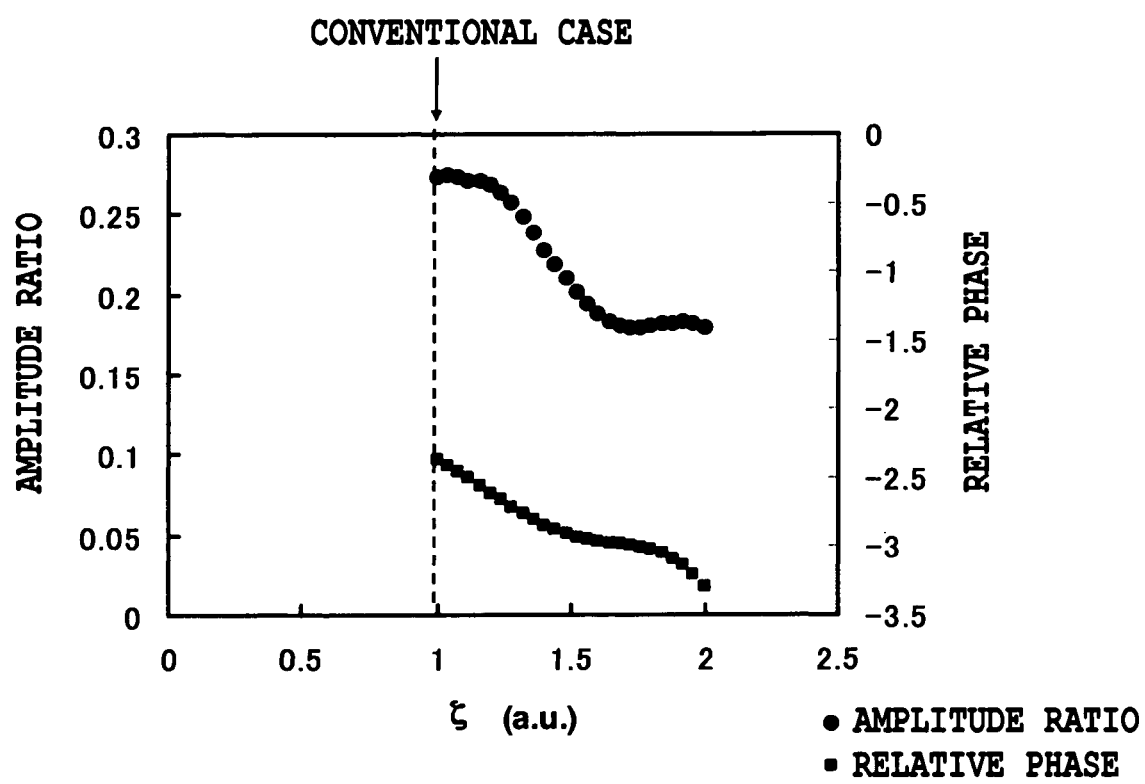
FIG. 3 is a graph showing a relation between amplitude and phase of a first side peak to a main peak and variable ζ showing structure of the parabola waveguide.
Figure 9A:
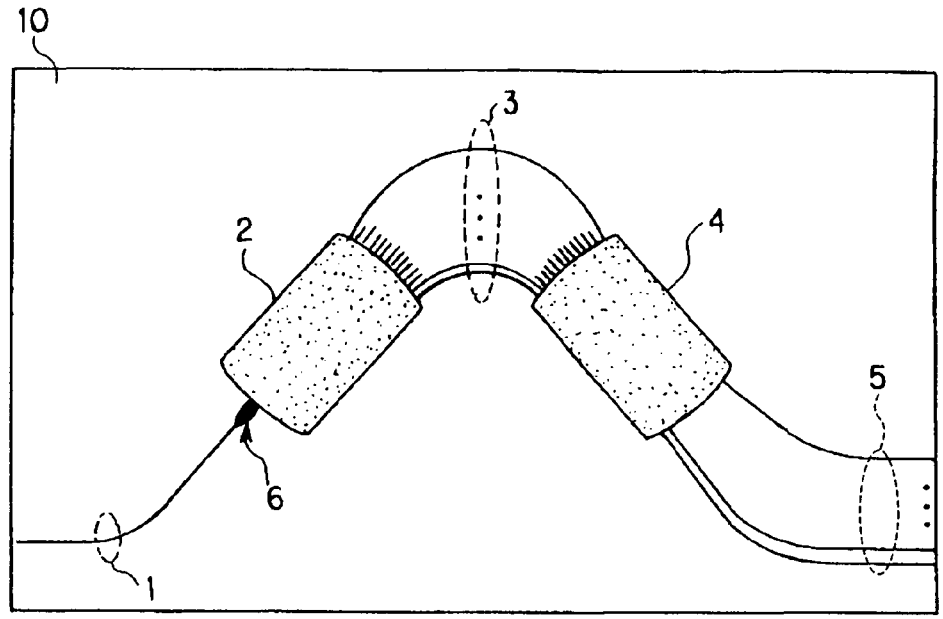
FIG. 9A is a block diagram of a conventional pass-band-expansion arrayed waveguide grating type optical multiplexer/demultiplexer circuit and an overall view of thereof.
Figure 9B:
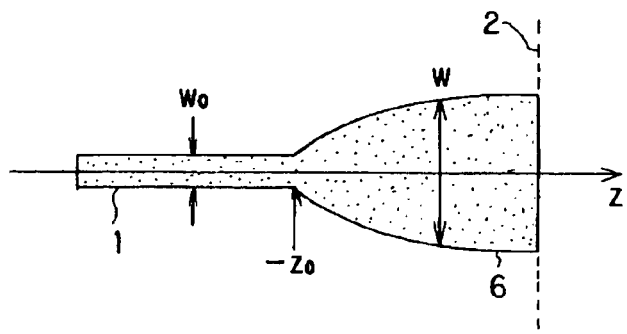
FIG. 9B is a block diagram of a conventional pass-band-expansion arrayed waveguide grating type optical multiplexer/demultiplexer circuit, that is, a block diagram of a parabola waveguide.
Figure 10A:
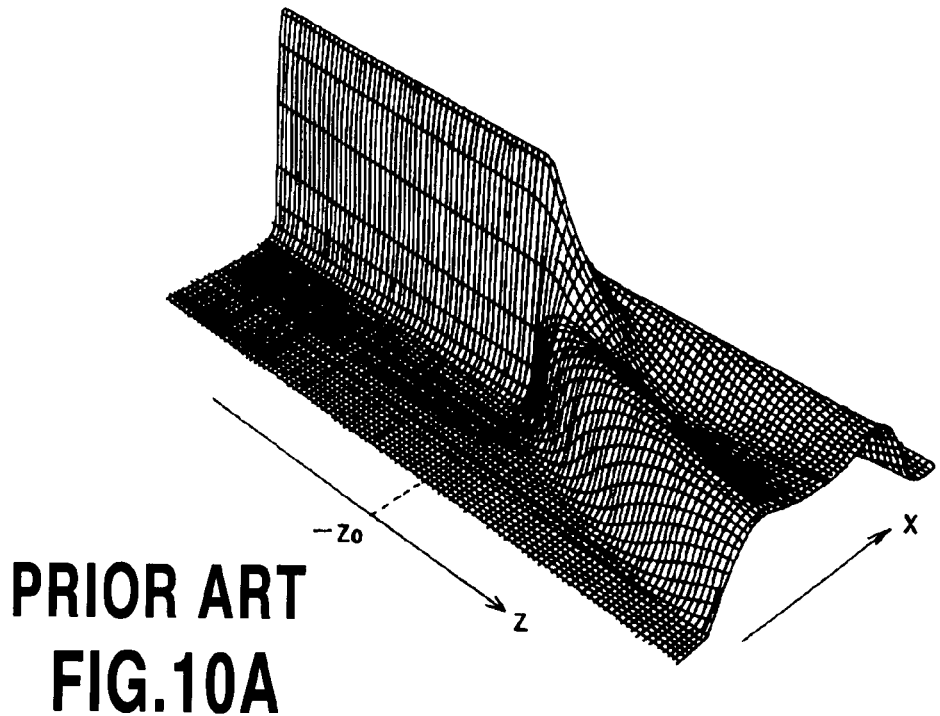
FIGS. 10A and 10B are distribution illustrations of an optical field of a parabola waveguide.
Figure 10B:
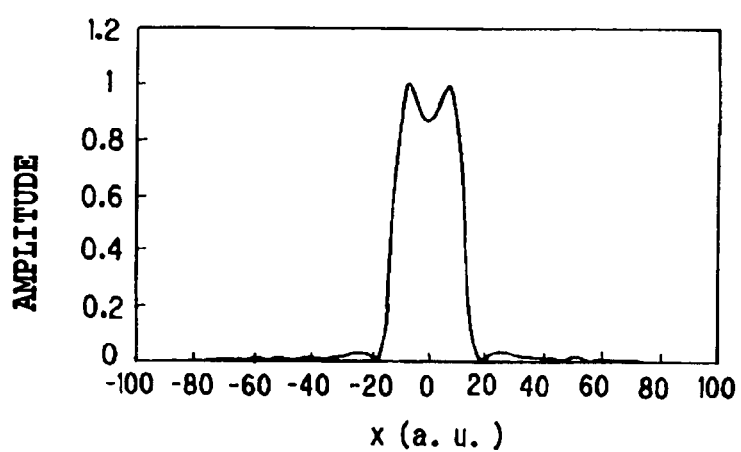

FIG. 3 shows the relative amplitude and relative phase of a first side peak to the amplitude and phase of a main peak as an approximate scale with a sinc function in the field distribution of parabola waveguide far-fields. Specifically, the relative amplitude and relative phase of the first side peak are calculated by Fourier-transforming the near-field pattern of a parabola waveguide obtained by using the beam propagation method. FIG. 3 is obtained by expressing the amplitude of the first side peak as an relative amplitude when setting the amplitude of the main peak to 1 and expressing the difference between phases of the first side peak to the phase of the main peak as the relative phase and plotting them to the variable ζ respectively. This variable ζ is a parameter showing the structure of a parabola waveguide and is normalized so that the length of a design value of a conventional parabola waveguide becomes ζ=1. In FIG. 3, $Z_0$ is set to 250 μm. The value of $Z_0$ of a parabola waveguide depends on the transmission characteristic of a pass band, etc., moreover, depends on the value of A in FIG. 9B.

Referring to FIG. 1, the relative amplitude of a sinc function is 0.217 and the relative phase thereof is 3.14. Referring to FIG. 3, it is found that as the value of ζ increases, both of the relative amplitude and relative phase tend to decrease. To make the value of a conventional design of ζ=1 approach an ideal value of a sinc function, it is necessary to bring ζ to a value close to 1.5 from the viewpoint of the relative amplitude. Moreover, from the viewpoint of the relative phase, it is necessary to bring ζ to a value nearby 1.8. Therefore, though it is impossible to make the both values completely coincide with each ideal value of the sinc function, it is estimated that there is an optimum design point of the value of ζ between 1.5 and 1.8.

Figure 4:
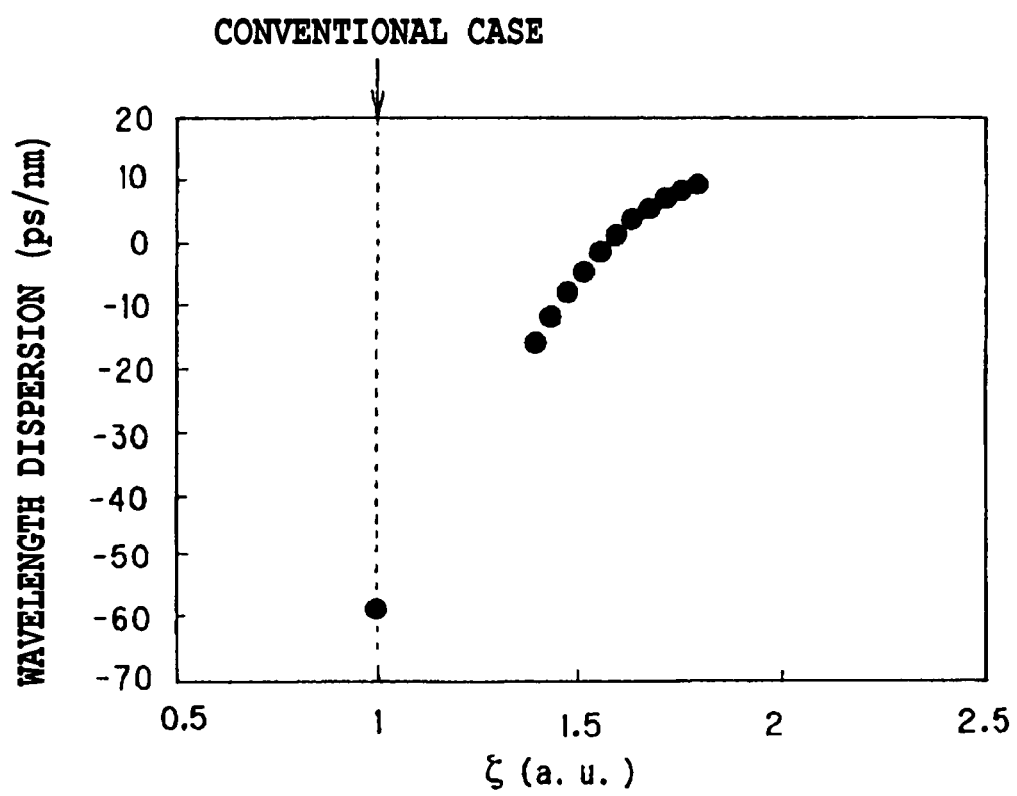
FIG. 4 is a graph showing a relation between wavelength dispersion and variable ζ showing a structure of the parabola waveguide.
Figure 11:
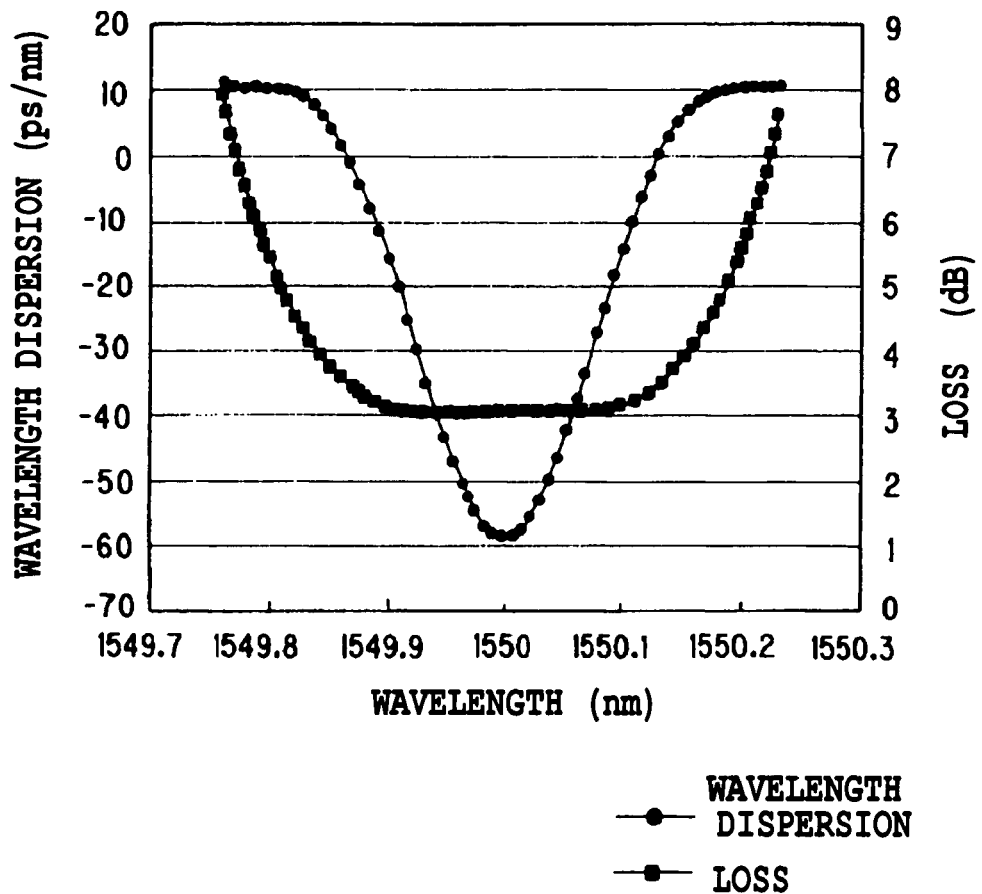
FIG. 11 is a graph showing a wavelength dispersion characteristic and loss of a conventional pass-band-expansion arrayed waveguide grating type optical multiplexer/demultiplexer circuit.

Therefore, to confirm the optimum design point of wavelength dispersion to the variable ζ, FIG. 4 shows the wavelength dispersion characteristic in an arrayed waveguide grating type optical multiplexer/demultiplexer circuit having a parabola waveguide whose structure is specified by ζ and whose pass band is expanded. Moreover, this shows the dependency of wavelength dispersion on the variable ζ showing the structure of a parabola waveguide on a wavelength (for example, wavelength close to 1,550 nm in FIG. 11) for providing highest wavelength dispersion in a channel. This arrayed waveguide grating type optical multiplexer/demultiplexer circuit has a channel spacing of 50 GHz.

As shown by the graph in FIG. 4, when setting the variable ζ to 1.6, wavelength dispersion becomes zero. This value ranges between 1.5 and 1.8 and therefore, it is possible to confirm the presence of the optimum design point as previously described. That is, by properly setting the variable ζ showing the structure of a parabola waveguide, the field distribution of far-fields of the parabola waveguide is properly defined and this represents that a wavelength dispersion value is resultantly decreased. Specifically, the variable ζ becomes an optimum value for reducing wavelength dispersion under a condition (refer to FIG. 3) determined by ζ to take 0.217 as an upper limit in an relative amplitude and ζ to take 3.14 as a lower limit in a relative phase. Therefore, it is possible to simultaneously realize the broad band characteristic of a transmission wavelength of a conventional parabola waveguide and the low wavelength dispersion characteristic which has not been realized so far at the same time.

Moreover, conventionally to derive wavelength dispersion, the whole arrayed waveguide grating type optical multiplexer/demultiplexer circuit is analyzed through numerical calculation to derive wavelength dispersion from second order differentiation of the phase angle of the transfer function of the analyzed value. However, in the present invention, because the procedure for deriving wavelength dispersion can be omitted by using the variable ζ, it is possible to provide a guide for properly determining the length of a parabola waveguide and greatly shorten the design time for optical circuit manufacturing.

Figure 5A:
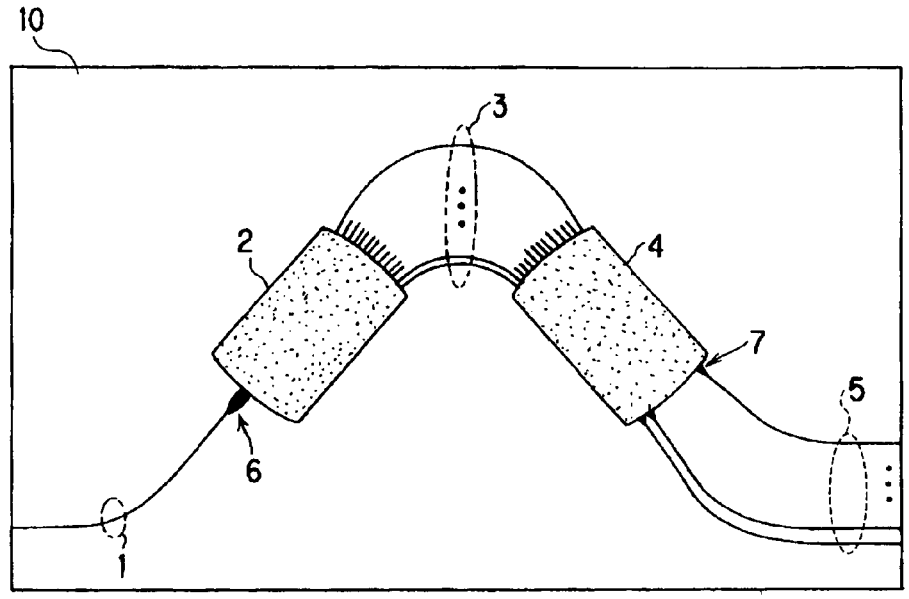
FIG. 5A is a block diagram of an arrayed waveguide grating type optical multiplexer/demultiplexer circuit showing an embodiment of the present invention and an overall view thereof.

FIG. 5A shows a block diagram of an arrayed waveguide grating type optical multiplexer/demultiplexer circuit serving as an embodiment of the present invention for realizing the above advantage and the circuit is described in detail by referring to FIG. 5A.

Figure 8:
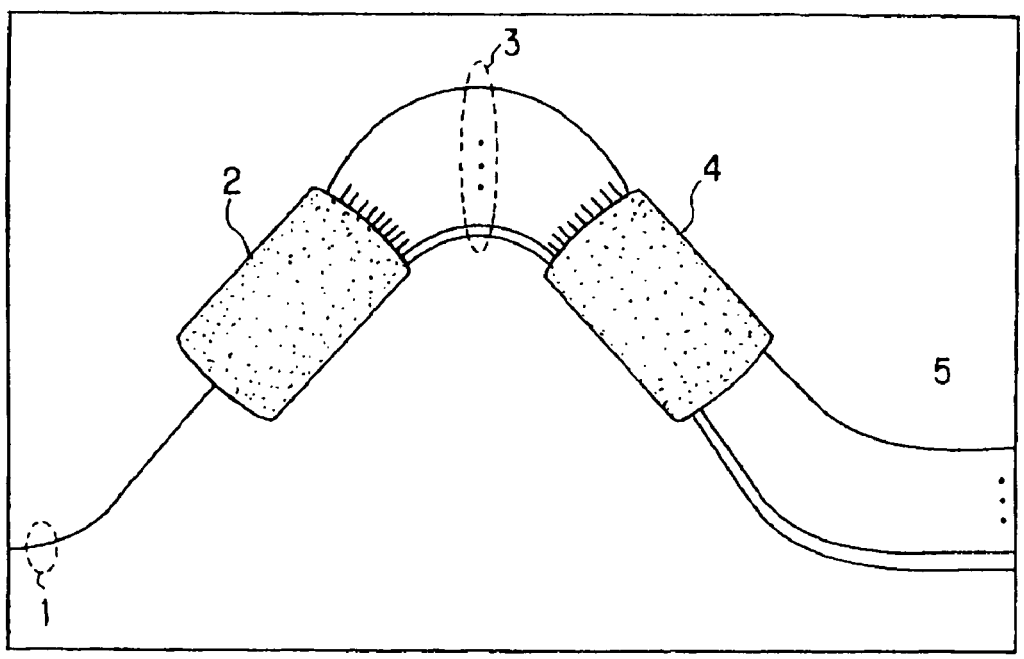
FIG. 8 is a block diagram of a conventional arrayed waveguide grating type optical multiplexer/demultiplexer circuit.

It is allowed that an arrayed waveguide grating type optical multiplexer/demultiplexer circuit of the present invention shown in FIG. 5A may have almost the same configuration as a conventional arrayed waveguide grating type optical multiplexer/demultiplexer circuit shown in FIG. 8. That is, the circuit has an input waveguide 1 serving as a first optical waveguide, a first slab waveguide 2 connected to the input waveguide 1, an arrayed waveguide 3 constituted of a plurality of optical waveguides which are connected to the first slab waveguide 2 and whose lengths sequentially become longer with a predetermined waveguide length difference, a second slab waveguide 4 connected to the arrayed waveguide 3, and an output waveguide 5 serving as second optical waveguides and a plurality thereof connected to the second slab waveguide 4. These are constituted by using a core formed on a flat substrate 10 and having a high refractive index and an optical waveguide constituted of a clad around the core. It is also allowed to use a plurality of input waveguides 1.

Figure 5B:
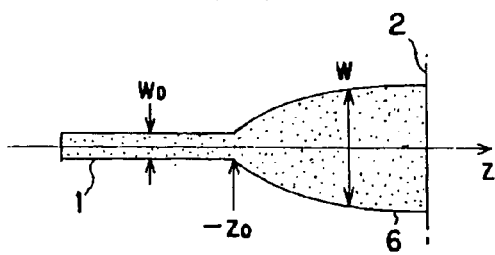
FIG. 5B is a block diagram of an arrayed waveguide grating type optical multiplexer/demultiplexer circuit of an embodiment of the present invention, that is, a block diagram of a parabola waveguide.

Moreover, a parabola waveguide 6 in a parabolic shape is arranged between the input waveguide 1 and the first slab waveguide 2. The parabola waveguide 6 may be the same as that shown in FIG. 9B. When expressing A as a coefficient, $W_0$ as the width of the input waveguide 1, and $Z_0$ as the length of the parabola waveguide 6 from the first slab waveguide 2, the width W of the input optical waveguide 1 contacting with the first slab waveguide 2 is defined by the following equation with respect to the propagation axis Z of optical wave (refer to FIG. 5B).

$$Z = A(W^2 - W_0^2) - Z_0 \qquad (1)$$

In this case, the following conditions are satisfied: $0 \geq Z \geq -Z_0'$ and $A > 0$.

However, in the case of the present invention, $Z_0$ is set so that the structure of the parabola waveguide defined by the above equation (1) has the variable ζ with low wavelength dispersion in accordance with the graphs shown in FIGS. 3 and 4. That is, it requires conditions that the parabola waveguide length $Z_0$ is present in a range decided by $Z_{a,0}$ in which a ratio in the amplitude absolute value between the main peak and the first side peaks of the field distribution for the parabola waveguide far-fields has an upper limit of 0.217 and $Z_{p,0}$ in which a relative phase between the main peak and the first side peaks in the field distribution for the parabola waveguide far-fields has a lower limit of 3.14 radian. That is, the condition of $Z_0$ is $Z_{a,0} \leq Z_0 \leq Z_{p,0}$.

Figure 5C:
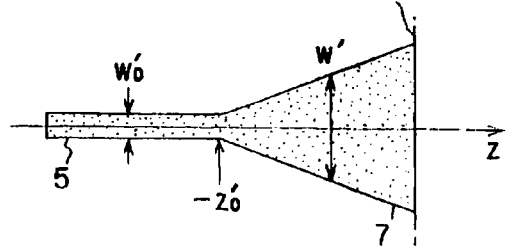
FIG. 5C is a block diagram of an arrayed waveguide grating type optical multiplexer/demultiplexer circuit showing an embodiment of the present invention, that is, a block diagram of a taper waveguide.

Moreover, in the case of an arrayed waveguide grating type optical multiplexer/demultiplexer circuit of the present invention, a taper waveguide 7 is further arranged between the second slab waveguide 4 and the output waveguide 5. In the case of the taper waveguide 7, when expressing A' as a coefficient, $W_0'$ as the width of the output waveguide 5, $Z_0'$ as the length of the taper waveguide 7 from the second slab waveguide 4, the width W' of the output optical waveguide 5 contacting with the second slab waveguide 4 is defined by the following equation with respect to the propagation axis Z of optical wave (FIG. 5C).

$$Z=A'(W'-W_0')-Z_0'$$

In the above equation, the following conditions are satisfied: $0 \geqq Z \geqq -Z_0'$ and $A \geqq 0$.

The above taper waveguide includes an optical waveguide with constant width when A' is equal to 0, that is, the inclination of the taper waveguide is 0. But it is not always necessary that the waveguide has a tapered shape.

Then, a manufacturing method of a waveguide of an optical circuit of the present invention is briefly described by referring to FIGS. 6A to 6E.

Figure 6A:
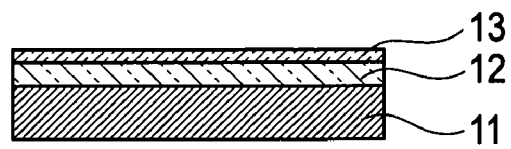
FIGS. 6A to 6E are illustrations showing manufacturing steps of an arrayed waveguide grating type optical multiplexer/demultiplexer circuit of the present invention.

A lower clad glass soot 12 mainly containing $SiO_2$ and core glass soot 13 obtained by adding $GeO_2$ to $SiO_2$ are deposited on a silicon substrate 11 serving as a flat substrate by using the Flame Hydrate Deposition method (FIG. 6A).

Figure 6B:
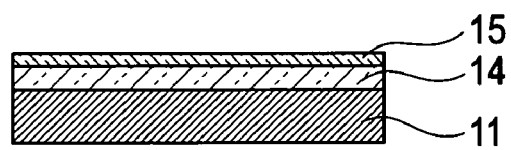
Figure 6C:
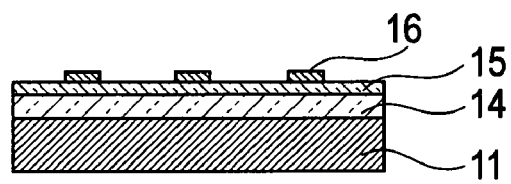

Thereafter, by transparentizing glass at a high temperature of 1,000° C. or higher, the lower clad glass soot 12 becomes a lower clad glass layer 14 and the core glass soot 13 becomes core glass 15. In this case, the lower clad glass soot 12 and core glass soot 13 are deposited so that the lower clad glass layer 14 has a thickness of 30 μm and the core glass 15 has a thickness of 7 μm (FIG. 6B).

Figure 6D:
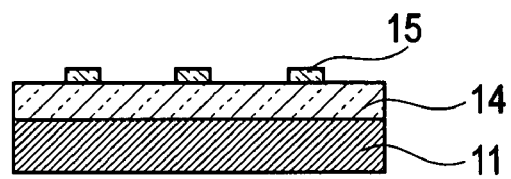

Then, an etching mask 16 is formed on the core glass 15 by using the photolithography technique (FIG. 6C) to pattern the core glass 15 through reactive ion etching (FIG. 6D). In this case, an optical waveguide having the shape shown in FIG. 5 is formed.

Figure 6E:
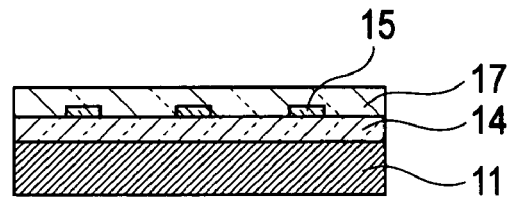

After removing the etching mask 16, an upper clad glass 17 is formed again by the Flame Hydrate Deposition method. A dopant such as $B_2O_3$ or $P_2O_5$ is added to the upper clad glass 17 to lower a glass transition temperature and the upper clad glass 17 is filled in the narrow gap between the patterned core glasses 15 (FIG. 6E).

The above optical circuit shows an arrayed waveguide grating type optical multiplexer/demultiplexer circuit in which an optical waveguide is constituted of a quartz glass optical waveguide on a flat silicon substrate as an embodiment of the present invention. Even if the material of the optical waveguide is polyimide, silicone, semiconductor, $LiNbO_3$ or the like, the present invention can be applied. Moreover, the flat substrate is not restricted to silicon.

Figure 7A:
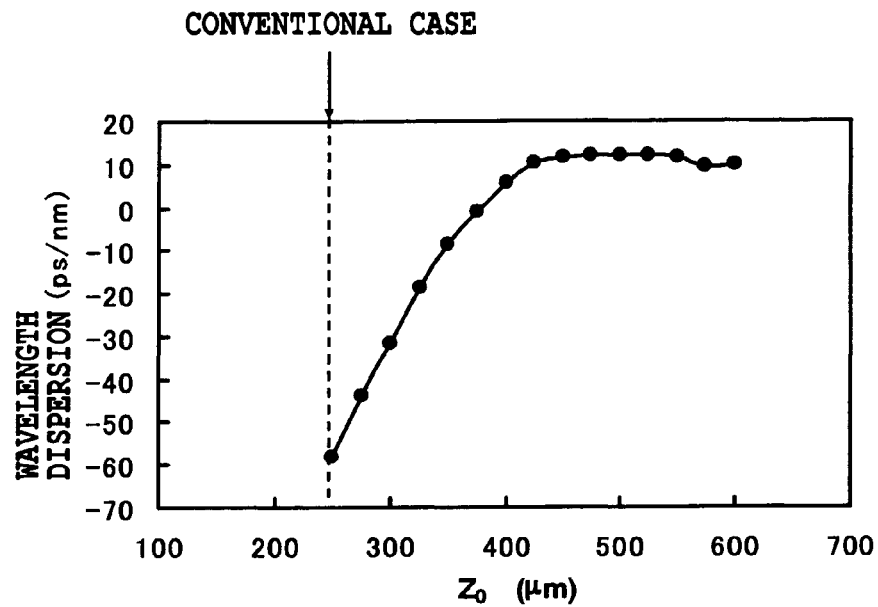
FIG. 7A is a graph showing a relation between parabola waveguide length $Z_0$ and wavelength dispersion of an arrayed waveguide grating type optical multiplexer/demultiplexer circuit of the present invention.

To actually verify the dependency of the wavelength dispersion shown in FIG. 4 on ζ, the wavelength dispersion of an arrayed waveguide grating type optical multiplexer/demultiplexer circuit in which a parabola waveguide length is designed in a range of 250 to 600 μm is measured. In this case, a parabola waveguide length $Z_0$=250 μm according to conventional design is used as a reference. FIG. 7A shows a relation between parabola waveguide length $Z_0$ and wavelength dispersion. That is, it is confirmed that wavelength dispersion becomes almost zero at ζ=1.6, that it $Z_0$=400 μm.

Figure 7B:
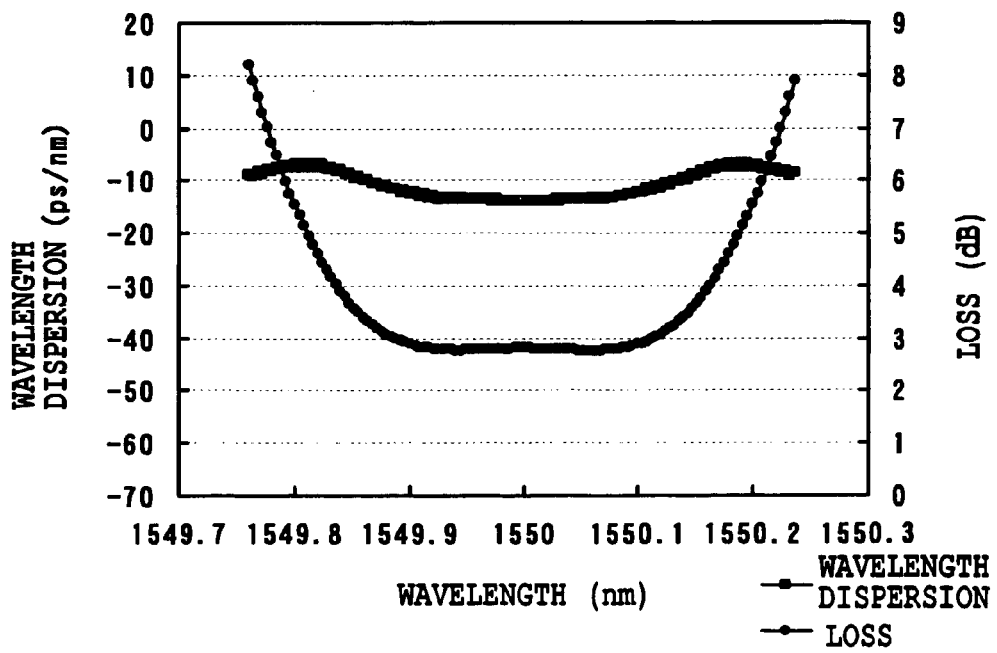
FIG. 7B is a graph showing a wavelength dispersion characteristic and loss of an arrayed waveguide grating type optical multiplexer/demultiplexer circuit of the present invention.

FIG. 7B shows the wavelength dispersion characteristic and loss of an arrayed waveguide grating type optical multiplexer/demultiplexer circuit having a parabola waveguide designed by setting ζ to 1.6, that is, setting $Z_0$ to 1.6×250=400 μm and a channel spacing of 50 GHz. As shown in FIG. 7B, in the case of the arrayed waveguide grating type optical multiplexer/demultiplexer circuit of the present invention, a low wavelength dispersion characteristic of −15 ps/nm or less is realized and it is possible to almost flatten the wavelength dispersion to a wavelength within 3 dB band. This wavelength dispersion is greatly decreased up to almost ¼ (approx. 26%) compared to the dispersion value −58 ps/mm according to conventional design shown in FIG. 4.

INDUSTRIAL APPLICABILITY

The present invention makes it possible to expand the transmission pass band of an arrayed waveguide grating type optical multiplexer/demultiplexer circuit and realize reduction of wavelength dispersion which has not been achieved so far at the same time. Moreover, by providing a parabola waveguide design guide which is not clarified in the prior art, it is possible to design efficiently.

The invention claimed is:

1. An arrayed waveguide grating type optical multiplexer/demultiplexer circuit, comprising on a flat substrate a plurality of first optical waveguides, a first slab waveguide which is connected to the first optical waveguides, an arrayed waveguide, connected to the first slab waveguide, consisting of a plurality of optical waveguides which sequentially become longer with a prescribed waveguide length difference, a second slab waveguide which is connected to the arrayed waveguides, and a plurality of second optical waveguides which are connected to the second slab waveguide; further comprising:

a parabola waveguide in which a width W of the first optical waveguide contacting with the first slab waveguide is defined by the following equation with respect to a propagation axis Z of optical wave, $$Z=A(W^2-W_0^2)-Z_0$$

where, A: a coefficient, and A>0, $W_0$: a width of the first optical waveguide, and $Z_0$: a length from the first slab waveguide;

and a taper waveguide in which a width W' of the second optical waveguide contacting with the second slab waveguide is defined by the following equation with respect to a propagation axis Z of optical wave, $$Z=A'(W'-W_0')-Z_0'$$

where,

A': a coefficient, $W_0'$: a width of the second optical waveguide, and $Z_0'$: a length from the second slab waveguide;

wherein the length $Z_0$ is set within a range defined by the following condition, $$Z_{a,0} \leqq Z_0 \leqq Z_{p,0}$$

where $Z_{a,0}$: a parabola waveguide length for which a ratio of the amplitude absolute value between a main peak and first side peaks in the field distribution of the parabola waveguide far-field has an upper limit of 0.217, and $Z_{p,0}$: a parabola waveguide length for which a relative phase between the main peak and the first side peaks in the field distribution of far-field has a lower limit of 3.14 radians.

2. An arrayed waveguide grating type optical multiplexer/demultiplexer circuit according to claim 1, wherein each waveguide is a silica glass optical waveguide on a flat silicon substrate.

* * * * *